United States Patent [19]

Müller et al.

[11] 4,406,817

[45] Sep. 27, 1983

[54] PROCESS FOR THE PRODUCTION OF SEDIMENTATION STABLE ANTI-FOAM AGENTS

[75] Inventors: Karl-Hans Müller, Bruchkobel, Fed. Rep. of Germany; Roland Tailfer, Muno, Belgium; Günter Türk, Hanau, Fed. Rep. of Germany

[73] Assignee: Degussa Aktiengesellschaft, Frankfurt, Fed. Rep. of Germany

[21] Appl. No.: 225,795

[22] Filed: Jan. 16, 1981

[30] Foreign Application Priority Data

Jan. 17, 1980 [DE] Fed. Rep. of Germany ....... 3001573

[51] Int. Cl.$^3$ ............................................... C09K 3/00
[52] U.S. Cl. ..................................... 252/348; 252/321
[58] Field of Search ............................... 252/321, 358

[56] References Cited

U.S. PATENT DOCUMENTS

| 3,250,727 | 5/1966 | Noll et al. | 252/358 |
|---|---|---|---|
| 3,560,401 | 2/1971 | O'Hara | 252/358 |
| 3,714,068 | 12/1973 | Miller | 252/358 |
| 4,008,173 | 2/1977 | Davis | 252/358 |

FOREIGN PATENT DOCUMENTS

| 23533 | 2/1981 | European Pat. Off. . |
| 1239276 | 12/1963 | Fed. Rep. of Germany . |
| 1293138 | 4/1969 | Fed. Rep. of Germany . |
| 1544001 | 9/1970 | Fed. Rep. of Germany . |
| 2550277 | 8/1975 | Fed. Rep. of Germany . |
| 2443853 | 4/1976 | Fed. Rep. of Germany . |
| 2925722 | 2/1981 | Fed. Rep. of Germany . |
| 1577613 | 2/1970 | France . |
| 2399958 | 12/1977 | France . |
| 903565 | 2/1961 | United Kingdom . |

*Primary Examiner*—Melvyn I. Marquis
*Assistant Examiner*—Patricia Short
*Attorney, Agent, or Firm*—Cushman, Darby & Cushman

[57] ABSTRACT

Precipitated, jet ground silica with specific physical-chemical properties is mixed with silicone oil, homogenized and heated to produce an antifoam agent. This type of antifoam agent can be used in pharmacy, in producing foam stopping latex emulsion, in the food field, in washing formulations, in the textile industry as well as in the pigment and varnish industries.

16 Claims, 1 Drawing Figure

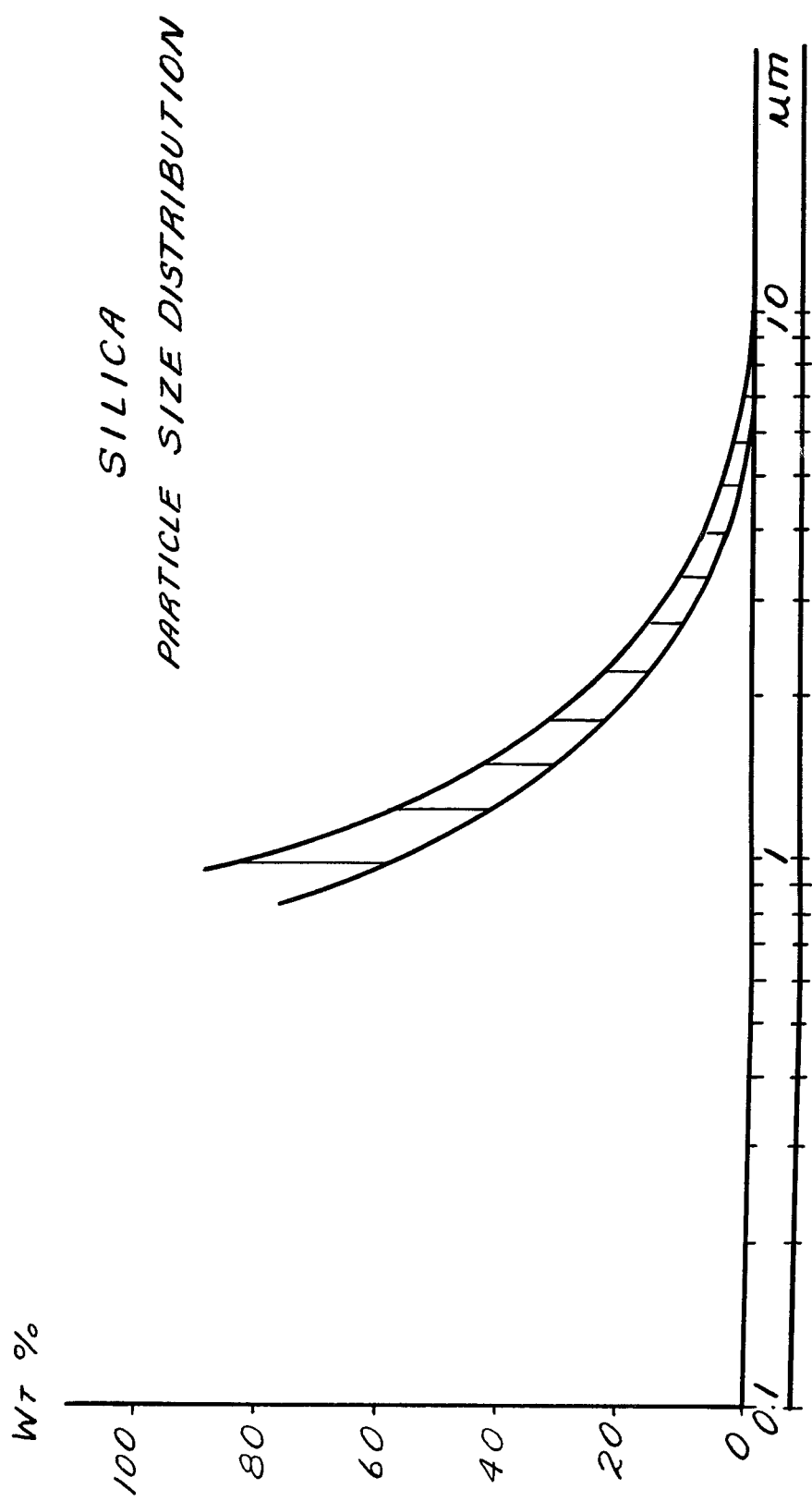

PROCESS FOR THE PRODUCTION OF SEDIMENTATION STABLE ANTI-FOAM AGENTS

BACKGROUND OF THE INVENTION

The invention is directed to a process for the production of a sedimentation stable antifoam agent for aqueous systems having a long-lasting activity.

It is known from Chevalier U.S. Pat. No. 3,113,930 to produce an antifoam agent by heating a finely divided filler such as finely divided silica with a multiple excess of a liquid dimethylpolysiloxane to above 350° C. and to emulsify with water while employing a special emulsifier.

From German Pat. No. 1769940 it is known to produce an antifoam agent for aqueous alkaline liquids by heating to a temperature between 100° and 300° C. a mixture of at least 70 weight % of an organosiloxane polymer having a viscosity of about 5 to about 100,000 centistokes, measured at 25° C., together with at least 0.5 weight % of a finely divided inorganic filler, such as, e.g. silica, and 0.01 to 1 weight % of basic catalyst.

SUMMARY OF THE INVENTION

The object of the invention is the development of a process for the production of sedimentation stable antifoam agent for aqueous systems having a long lasting activity comprising mixing 0.5 to 20 parts of a precipitated jet mill ground silica having the following physical chemical properties:

| | | |
|---|---|---|
| Surface area according to BET (DIN 66 131) | $M^2/g$ | 160 ± 30 |
| Particle size distribution curve of the secondary particles according to FIG. 1 (Coulter Counter) | | |
| Loss on drying 2 hours at 105° C. (DIN 55 921) | wt. % | 6 ± 3 |
| Loss on ignition* 2 at 1000° C. (DIN 55 921) | wt. % | 5 ± 2 |
| pH in 5% aqueous dispersion (DIN 53 200) | | 7 to 11 |
| $SiO_2$ content** | wt. % | > 90 |

*based on the material dried 2 hours at 105° C.
**based on the material fired 2 hours at 1000° C.

with 80 to 99.5 parts of a dimethylpolysiloxane oil having a viscosity at 25° C. of 20 to 1,000,000 centistokes, homogenizing with a homogenizer and in a given case heating the thus obtained mixture to a temperature of 25° to 380° C. and holding the temperature for a time span of 0.1 to 1.0 hours.

BRIEF DESCRIPTION OF THE DRAWINGS

The single FIGURE of the drawings shows the particle size distribution curve of the secondary particles and is based on the numerical values set forth in Table 5.

Unless otherwise indicated all parts are by weight.

The process can comprise, consist essentially of or consist of the steps set forth with the stated materials.

According to a preferred form of the invention, there can be added alkali solution in the jet mill grinding. Examples of alkali are aqueous sodium hydroxide and potassium hydroxide. The pH of the silica thereby can be adjusted to a pH of 7 to 11, preferably 8 to 10, especially 8.3 (e.g. using aqueous sodium hydroxide).

The jet grinding of the silica can take place for example as described in Reinhardt German AS No. 1293138, Example 3. The entire disclosure of Reinhardt is hereby incorporated by reference and relied upon.

In a further illustrative form of the invention, there can be used a dimethylpolysiloxane oil which has a viscosity at 25° C. of 100 to 10,000 centistokes. In a preferred form the viscosity can be 350 cs at 25° C.

The hydrophobization reaction sought proceeds and is supervised through the strived for regulation of the pH. Compared to the separate working in of the silica and alkali there is formed a defoaming system with increased activity. By fixing the alkali on the surface of the weakly alkaline adjusted silica, it is guaranteed that the alkali is also locally available at the active centers at which the reaction occurs with the silicone oil.

In the separate addition of alkali to the liquid reaction mixture a premature hydrolytic splitting of the silicone oil can occur, especially at high temperatures whereby undefined products of splitting are formed. This is made noticeable in part through a coloring of the liquid medium.

The process of the invention to that extent represents a simplification since in place of three reactants the chemical reaction is reduced to two reactants.

The antifoam agent obtained according to the invention because of the intensive homogenization shows a surprisingly high storage stability (reduced sedimentation).

The sedimentation stable antifoam agent produced according to the invention can be used in pharmacy, in the production of strongly foam stopping latex emulsions, in the food field, in washing formulations, in the textile industry as well as in the pigment and varnish industries.

The process of the invention will be further explained and described in connection with the examples.

DETAILED DESCRIPTION 6 grams of precipitated silica (its exact characteristics are set forth below) were mixed with 94 grams of dimethylpolysiloxane DC 200 fluid, 350 cp of Dow Corning. Subsequently this mixture was homogenized by the ALM machine, nozzle 006. The dispersion resulting therefrom as heated and held at the desired temperature, in each case for 2 hours.

After the cooling the dispersion were stored for 6 weeks.

Surprisingly during the storage no sedimentation occurred during the storage time with the dispersion heated to 300° C.

Table 1 shows the different sedimentation behavior of the antifoam agent of the invention according to the temperature of production.

TABLE 1

| Temperature of Production | Sedimentation, Amount and Condition |
|---|---|
| 100° C. | 6.6% solid, hard paste |
| 200° C. | 3.3% hard paste |
| 300° C. | no sediment ascertained |

DEFOAMING EFFECT

Shaking Test 100 ml of a 5% Hostapon-T solution (its exact characteristics are set forth below) are filled into a 250 ml shaking cylinder. The cylinder is plugged and inserted in an invertable apparatus. It was inverted ten times in order to form a foam. The coresponding amount of foam and the volume of solvent were read off. 10 μl of defoamer were added together with 5 μl of a 10% Hostapon-T-solution. The Hostapon-T-solution is very viscous and serves therefore to carry out the amount of defoamer completely from the peak. The mixing cylinder is plugged again and inverted ten times. The amount of foam is then read off. The measurement is repeated nine more times.

The results of the shaking test are collected in Table 2.

TABLE 2

| Temperature of Production | Height of Foam | | | | | | | | | | |
|---|---|---|---|---|---|---|---|---|---|---|---|
| | 0 | 1 | 2 | 3 | 4 | 5 | 6 | 7 | 8 | 9 | 10 |
| 100° C. | 200 | 110 | 112 | 112 | 112 | 110 | 110 | 110 | 108 | 108 | 108 |
| 200° C. | 200 | 106 | 106 | 106 | 106 | 106 | 106 | 106 | 106 | 106 | 106 |
| 300° C. | 200 | 106 | 106 | 106 | 106 | 106 | 106 | 106 | 106 | 106 | 106 |

Latex Test 50 grams of Primal AC 25 (its exact characteristics are given below) were foamed with 50 grams of water and 0.2 ml of defoamer in the Hamilton-Beach Blender (its exact characteristics are given below).

Then the weight of 100 ml of test solution was ascertained.

The results are collected in Table 3

TABLE 3

| Latex-Defoaming Test | |
|---|---|
| Temperature of Production | Average Value Grams |
| 100° C. | 67.99 |
| 200° C. | 72.12 |
| 300° C. | 72.95 |
| Silicone oil without silica | 43.45 |

The silica used is a precipitated, jet mill ground silica and had the following physical-chemical characteristics:

| Surface area according to BET (DIN 66 131) | $M^2/g$ | 160 |
|---|---|---|
| Average particle size distribution curve of the secondary particles according to Table 4 (Coulter Counter) | | |
| Loss on drying 2 hours at 105° C. (DIN 55 921) | wt. % | 6 |
| Loss on ignition* 2 hours at 100° C. (DIN 55 921) | wt. % | 5 |
| pH in 5% aqueous dispersion (DIN 53 200) | | 8.3 |
| $SiO_2$ content** | % | 98 |

*based on the material dried 2 hours at 105° C.
**based on the material ignited 2 hours at 1000° C.

TABLE 4

| Particle Size Distribution (Coulter Counter) 50μ Cell | |  |
|---|---|---|
| Particle Size | Residue Wt. % | |
| 18.35 | 0.00 | 0.00 |
| 15.14 | 0.00 | 0.00 |
| 12.50 | 0.00 | 0.00 |
| 10.30 | 0.00 | 0.83 |
| 8.50 | 0.00 | 0.83 |
| 7.00 | 0.00 | 1.35 |
| 5.80 | 1.03 | 1.50 |
| 4.80 | 3.51 | 3.89 |
| 3.95 | 6.21 | 6.26 |
| 3.26 | 6.89 | 9.61 |
| 2.69 | 16.08 | 15.80 |

TABLE 4-continued

| Particle Size Distribution (Coulter Counter) 50μ Cell | | |
|---|---|---|
| Particle Size | Residue Wt. % | |
| 2.22 | 19.57 | 19.21 |
| 1.83 | 28.93 | 28.78 |
| 1.51 | 38.43 | 38.32 |
| 1.25 | 50.38 | 50.12 |
| 1.03 | 70.76 | 70.43 |

The dispersing of the 0.05 gram sample in 100 ml of electrolyte solution took place through 10 minutes stirring carried out with a wing stirrer at 1000 rpm. The particles above 28μ were sieved out.

The polydimethylsiloxane DC 200 fluid ® used of the Dow Corning Company is a dimethylsiloxane polymer having a viscosity between 0.65 to 100,000 centistokes, preferably 350 centistokes (measured at 25° C.).

The Hostapon-T-solution used is a non-ionic wetting agent.

It is made by Hoechst. The wetting agent consisted of the sodium salt of fatty acid methyl tauride (preponderantly oleic acid) and is characterized as follows:

| Active material | about 63% |
|---|---|
| Free fatty acid | maximum 2% |
| NaCl | 28% |
| Water | maximum 1% |

The latex Primal AC 25 ® used is an acrylate emulsion having the following properties:

| Solids content | wt. % | 46 to 47 |
|---|---|---|
| pH-W | | 9.0 to 9.5 |
| Weight per U.S. gallon | lbs. | 8.8 to 8.9 |
| Bulk density (dry) per U.S. gallon | lbs. | 0.103 |

The Hamilton-Beach Blendor ® used is made by the Hamilton Beach Division, Scovill, Wash., U.S.A. and is a commercial stirring device having a speed of rotation of 18,000 rpm.

TABLE 5

| Particle Size Distribution (Coulter Counter) 50 μ Cell | | |
|---|---|---|
| Particle Size Distribution | Residue | wt. % |
| 18.35 | 0.0 | 0.0 |
| 15.14 | 0.0 | 0.0 |
| 12.50 | 0.0 | 0.0 |
| 10.30 | 0.7 | 0.95 |
| 8.50 | 0.7 | 0.95 |
| 7.00 | 0.14 | 1.55 |
| 5.80 | 1.27 | 1.72 |
| 4.80 | 3.30 | 4.47 |
| 3.95 | 5.32 | 7.20 |
| 3.26 | 8.16 | 11.05 |
| 2.69 | 13.43 | 18.17 |
| 2.22 | 16.32 | 22.09 |
| 1.83 | 24.46 | 33.09 |
| 1.51 | 32.57 | 44.07 |

TABLE 5-continued

| Particle Size Distribution (Coulter Counter) 50 μ Cell | | |
|---|---|---|
| Particle Size Distribution | Residue | wt. % |
| 1.25 | 42.60 | 57.63 |
| 1.03 | 59.9 | 81.00 |

The dispersing of the 0.05 gram sample in 100 ml of electrolyte solution took place through 10 minutes stirring carried out with a wing stirrer at 1000 rpm. The particles above 28μ were sieved out.

The entire disclosure of German priority application No. P 3001573.7-43 is hereby incorporated by reference.

DIN is the abbreviation for German Industrial Standard.

The parts of precipitated silica and dimethylpolysiloxane oil are based on a total of 100 parts of these two materials.

What is claimed is:

1. A process for the production of a sedimentation stable antifoam agent for aqueous systems having a long lasting activity comprising mixing 0.5 to 20 parts of a precipitated, jet mill ground silica having the following properties:

| | | |
|---|---|---|
| Surface area according to BET (DIN 66 131) | M²g | 160 ± 30 |
| Particle size distribution curve of the secondary particles according to FIG. 1 (Coulter Counter) | | |
| Loss on drying 2 hours at 105° C. (DIN 55 921) | wt. % | 6 ± 3 |
| Loss on ignition* 2 at 1000° C. (DIN 53 200) | wt. % | 5 + 2 |
| pH in 5% aqueous dispersion (DIN 53 200) | | 8.3 |
| SiO₂ content** | wt. % | >90 |

*based on the material dried 2 hours at 105° C.
**based on the material fired 2 hours at 1000° C.

with 80 to 99.5 parts of a dimethylpolsiloxane oil having a viscosity at 25° C. of 20 to 1,000,000 centistokes, homogenizing the mixture and heating the mixture to a temperature of 25° to 380° C. and holding at this temperature for a time span of 0.1 to 10 hours, said jet mill ground silica having been treated with alkali solution during the jet mill grinding to adjust the pH of the silica to 8.3.

2. A process for the production of a sedimentation stable antifoam agent for aqueous systems having a long lasting activity comprising mixing 0.5 to 20 parts of a precipitated, jet mill ground silica prepared according to claim 1 having the following properties:

| | | |
|---|---|---|
| Surface area according to BET (DIN 66 131) | m²g | 160 |
| [Average particle size distribution curve of the secondary particles according to Table 4 (Coulter Counter)] | | |
| Loss on ignition 2 hours at 105° C. (DIN 55 921) | wt. % | 6 |
| Loss on ignition* 2 hours at 100° C. (DIN 55 921) | wt. % | 5 |
| pH in 5% aqueous dispersion (DIN 53 200) | | 8.3 |
| SiO₂ content** | % | 98 |

*based on the material dried 2 hours at 105° C.
**based on the material ignited 2 hours at 1000° C.

| Particle Size Distribution (Coulter Counter) 50 μ Cell | | |
|---|---|---|
| Particle Size | Residue | Wt. % |
| 18.35 | 0.00 | 0.00 |
| 15.14 | 0.00 | 0.00 |
| 12.50 | 0.00 | 0.00 |
| 10.30 | 0.00 | 0.83 |
| 8.50 | 0.00 | 0.83 |
| 7.0 | 0.00 | 1.35 |
| 5.80 | 1.03 | 1.50 |
| 4.80 | 3.51 | 3.89 |
| 3.95 | 6.21 | 6.26 |
| 3.26 | 6.89 | 9.61 |
| 2.69 | 16.08 | 15.80 |
| 2.22 | 19.57 | 19.21 |
| 1.83 | 28.93 | 28.78 |
| 1.51 | 38.43 | 38.32 |
| 1.25 | 50.38 | 50.12 |
| 1.03 | 70.76 | 70.43. |

3. A process according to claim 2 wherein the viscosity of the dimethylpolysiloxane oil is 100 to 10,000 centistokes.

4. A process according to claim 3 wherein the viscosity of the dimethylpolysiloxane oil is 350 centistokes.

5. A process according to claim 4 wherein there are employed 6 parts of precipitated silica and 94 parts of dimethylpolysiloxane oil.

6. A process according to claim 2 wherein jet mill grinding is carried out under conditions that the pH of the silica during said grinding is 8.3.

7. A process according to claim 6 wherein the viscosity of the dimethylpolysiloxane oil is 350 centistokes.

8. A process according to claim 7 wherein there are employed 6 parts of precipitated silica and 94 parts of dimethylpolysiloxane oil.

9. The product produced by the process of claim 1.
10. The product produced by the process of claim 2.
11. The product produced by the process of claim 3.
12. The product produced by the process of claim 4.
13. The product produced by the process of claim 5.
14. The product produced by the process of claim 6.
15. The product produced by the process of claim 7.
16. The product produced by the process of claim 6.

* * * * *